March 22, 1960
H. M. COWAN
2,929,401
CHECK VALVE WITH PLURAL SEATING
Filed March 11, 1957
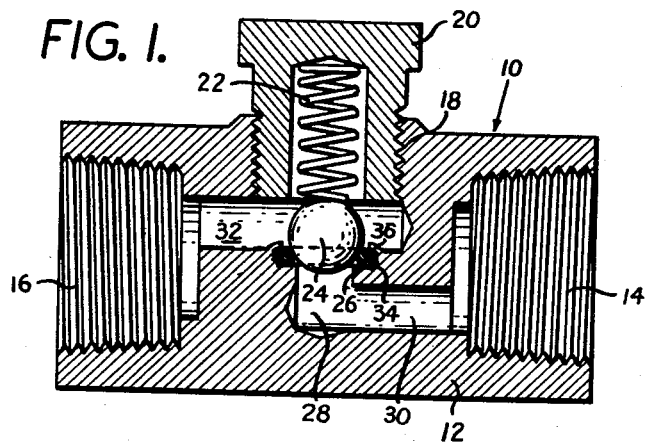
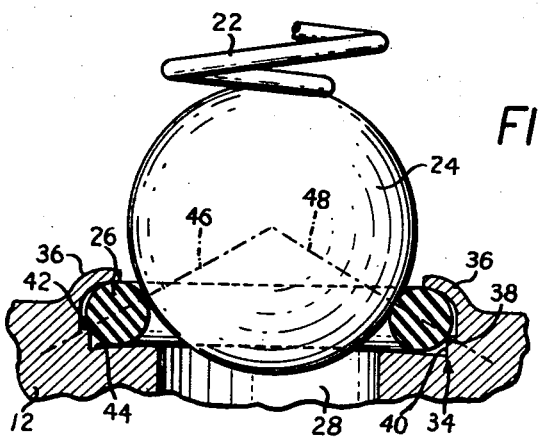
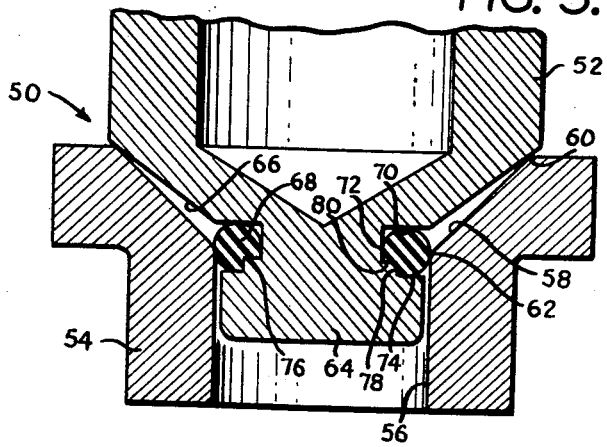
INVENTOR
HERBERT M. COWAN
BY
ATTORNEY.

United States Patent Office 2,929,401
Patented Mar. 22, 1960

2,929,401

CHECK VALVE WITH PLURAL SEATING

Herbert M. Cowan, Bellmore, N.Y.

Application March 11, 1957, Serial No. 645,077

1 Claim. (Cl. 137—516.29)

This invention relates to a check valve for fuel oil systems and the like. The application is a continuation-in-part of patent application Serial No. 336,577 which I filed on February 12, 1953, now abandoned.

The principal object of this invention is the provision of a spring-urged check valve for use in fuel oil lines and the like which will function efficiently in any desired or required positions. Check valves are used in many installations involving the flow of a fluid in a given direction only, the object being to prevent a back flow of the fluid in the opposite direction. For purposes of illustration, the invention will be illustrated and described solely in terms of its application to fuel oil lines of the type which feed oil to an oil burner.

Conventional check valves used in fuel oil lines function efficiently only when supported in vertical position. Consequently, it is necessary to provide at least a small section of fuel oil line on a vertical plane in order to install a conventional check valve.

The check valve which is herein described and claimed functions efficiently when installed in a horizontal position in connection with a horizontally extending fuel oil line. It is therefore possible, with this check valve, to run a fuel line from the oil tank to the oil burner along a substantially horizontal line and to install the present check valve therein. Installations of fuel line systems are thereby facilitated in many cases since it is frequently most undesirable and sometimes very difficult to include a vertical section in the fuel line solely for the purpose of making it possible to install a conventional check valve.

Although the present check valve is designed for use in a horizontal position, it is equally useful and efficient in any other position, as for example a vertical position or an inclined position and consequently it may be installed in any predetermined or selected position, depending upon the individual requirements of each oil line system.

The check valve which is herein described and claimed is spring-urged for positive action irrespective of its position. It does not depend on gravity for seating its valve closure member in its seat nor does it depend either upon suction or pressure in the fuel line to seat its closure member. Suction or pressure in the fuel line is not required to close the valve but it serves as the means of effecting a tighter seal, the greater the suction or pressure, the tighter the seal.

The present check valve is neither affected by nor is it the cause of vibrations in the fuel lines and it prevents humming sounds in the fuel tank. It is quiet in operation and it does not chatter. Furthermore, it possesses anti-syphon characteristics and it tends at all times to keep oil in the lines.

An important feature of this invention is the provision of means for removing and replacing the spring, the valve closure member and the valve seat without disengaging the valve housing from the fuel lines. The fuel lines are secured to the two ends of the valve housing. The spring, closure member and seat are removable through an opening in the side of the valve housing.

By reason of the valve construction herein described, a typical check valve made in accordance with this invention for use in a typical domestic fuel line system will resist a suction or pressure of upwards of 5000 lbs. per square inch.

An important feature of this invention is the manner in which the ring which constitutes the valve seat is held in place in the valve housing. An annular groove or channel is formed in the valve housing to receive the ring. It is necessary to compress the ring in order to insert it into said annular groove or channel and once it is introduced therein, it springs back to its original shape and dimensions and it thereby tends to retain itself in said groove or channel. An annular shoulder is formed at the bottom of the annular groove or channel. When the pressure or suction within the valve is so high or great that the valve ball is caused to compress the ring, a point is reached where the ball is brought to rest against said annular shoulder which prevents any further movement of the ball in response to the pressure or suction forces. The ring continues to serve as the seal between the ball and the valve housing and the annular shoulder serves merely to prevent the ball from permanently distorting the ring and it also prevents the ring from being blown or sucked out of the annular groove or channel in which it is mounted.

It has been stated that the check valve herein claimed possesses anti-hum characteristics. Hum is known to result from impulses in the oil stream formed by the gear teeth of gear pumps. The oil tank from which the oil is drawn serves as a sound chamber. The present valve prevents hum because its closure member, preferably a ball, possesses considerable weight, also because it is always under spring tension, and finally because the valve ports are relatively small. For example, the valve ports may be only three-sixteenths of an inch in diameter, and even small although the oil lines to which the valve is connected may have an inside diameter of a quarter of an inch or more. Consequently, these several factors combine to restrict the oil flow, resulting in the pump operating under a slight vacuum of approximately five inches. The continuity of the impulses is thereby interrupted and the hum is either reduced in intensity or eliminated altogether.

It has also been stated that the present check valve possesses anti-syphon characteristics. This feature results from the fact that a relatively strong spring is provided in the valve housing in engagement with the valve closure member, preferably a ball. This factor is also attributable to the fact that the ball is relatively heavy. The combination of the spring action and the weight of the ball tends to prevent the valve from passing or leaking liquid when the pump is not in operation, as when a leak develops in the line between the valve and the pump.

In a second form of this invention, the valve ring is not seated opposite a movable ball. Instead, the valve ring is mounted on a movable valve stem which moves the valve ring into and out of engagement with the valve seat. In this case, as in the case of the use of a valve ball, the features above set forth fully apply, including the metal-to-metal stop between the moving valve member and the fixed valve member to prevent permanent distortion and deformation of the valve ring.

An important feature of the present invention which is not found in my earlier patent application above identified, is an annular rib or bead which is concentric with the valve ring and which is engageable therewith. This annular rib or bead serves as a valve seat relative to the valve ring and it provides a line contact therewith. Under increased pressure, the annular rib or bead presses into the valve ring. A very efficient, tight seal is provided between the annular rib or bead and the valve ring both when the two engage each other relatively lightly and also when they are brought together under substantial pressure.

The invention is illustrated in the accompanying drawing in which:

Fig. 1 is a longitudinal section through a check valve made in accordance with one form of this invention.

Fig. 2 is a fragmentary enlarged section showing the valve ball, valve ring and valve seat of said check valve.

Fig. 3 is a fragmentary sectional view of a check valve made in accordance with a second form of this invention.

Referring now to Figs. 1 and 2 it will be seen that check valve 10 made in accordance with the first form of this invention comprises the following component parts:

A valve housing 12, a threaded port 14, a second threaded port 16, these two ports being situated in axial alignment with each other at opposite ends of housing 12, a threaded hole 18 extending laterally of the valve housing intermediate the two ports, a hollow threaded plug 20 which may be screwed into said threaded hole 18, a compression spring 22 disposed within said hollow plug 20, the upper end of said spring bearing against the top of said plug, the lower end of said spring bearing against a valve ball 24, a resilient valve ring 26 situated for engagement with said valve ball, a valve chamber formed within said valve housing to accommodate said valve ball and said valve seat, a passage 30 communicating between said chamber and port 14, and a second passage 32 communicating between said chamber and port 16.

The flow is normally leftward as viewed in Fig. 1, port 14 functioning as the inlet port and port 16 as the outlet port. The pressure of the fluid against the valve ball 24 will raise the ball against the action of the spring and thereby dislodge it from the valve ring 26. The valve would thereby be opened for the passage of fluid from port 14 through passage 30, chamber 28 and passage 32 to port 16. The force exerted by the spring upon the ball may be adjusted by adjustment of the plug 20. This will determine the yielding point of the ball to the pressure of the fluid. Should there be any back flow from port 16 through passage 32, or should a suction force be set up in port 14, the valve ball 24 will be pushed back upon the valve ring, not only by said back pressure or suction force but also by the action of the spring. This will close the valve to a backward flow.

Reference to Fig. 2 will disclose the features of the valve seat 34. It will be observed that the valve ring 26 rests upon an annular wall 44 and that it is held in place on said wall by means of an inwardly curved annular flange 36. This annular flange normally extends in vertical direction as viewed in Fig. 2 since it is machined into the valve body or housing by means of a tool inserted through opening 18. But after said flange is formed, it is bent or spun over into its curved condition shown in Fig. 2, rendering it capable of serving as a retaining flange for the valve ring.

It will now be observed that an annular shoulder or rib 38 is formed in valve seat 34 on annular wall 44. Annular shoulder or rib 38 has a vertical component 40 and a horizontal component 42 which meet substantially at right angles. It will be observed that when the valve ball 24 is seated against the valve ring 26, radial lines 46 and 48 may be drawn from the center of the ball through the annular shoulder or rib 38.

Fig. 2 shows the valve in closed position but the ball is under relatively slight pressure. Consequently, it presses only lightly against the valve ring 26 and causes said valve ring to bear against the shoulder or rib 38. There is only a narrow line contact between said valve ring and said shoulder or rib but this is sufficient to provide a good seal between the shoulder or rib and the valve ring even under relatively slight pressure.

When increased pressure is exerted upon the ball, it will move downwardly as viewed in Fig. 2 and it will thereby compress the valve ring and deform said valve ring against the annular shoulder or rib. Such deformation is illustrated in Fig. 3. The increased pressure between the valve ball and the valve ring and also between the valve ring and the annular shoulder or rib will produce a very tight seal. Further pressure upon the valve ball will bring it into contact with the inner edge of wall 44. This will serve as a positive stop for the valve ball and prevent deformation of the valve ring beyond its elastic limit. The valve ring may be made of rubber, natural or synthetic, or any other suitable resilient material. It may be of the type commonly known as an O-ring.

Turning now to the second form of this invention and to Fig. 3, it will be observed that a valve 50 is provided which may be used as a check valve or for other purposes. It has a movable valve member or stem 52 which may be hollow, as shown, or not. A valve housing 54 is provided to receive the valve stem 52. It will be observed that a cylindrical hole 56 is provided in the housing 54 and that at its upper end, said cylindrical hole flares outwardly to form a conical wall 58 on the valve housing 54. An annular corner 60 is formed at the upper peripheral edge of the conical wall 58 and it will be observed that the valve stem 52 has a conical shoulder 66 which is engageable with said annular corner 60. Contact is made between these two elements only when substantial pressure or suction develops within the valve housing. It is this contact between metal and metal which prevents permanent deformation of the valve ring 68.

It will now be observed that an annular corner 62 is formed along the lower peripheral edge of conical wall 58 and along the upper peripheral edge of the cylindrical opening 56. It is along this corner 62 that contact is made between the valve ring 68 and the valve housing 54 although it will be understood that the proportions of the parts shown may be varied so as to bring the valve ring 68 below said annular corner 62 and into the cylindrical hole 56 proper.

The lower end of valve stem 52 is a reduced portion 64 which projects downwardly into the cylindrical hole 56. An annular groove is formed in said reduced stem portion 64 to accommodate the valve ring 68. This annular groove has a top wall 70, an inner vertical wall 72, and a bottom wall 74 which may be parallel to the top wall 70. The valve ring 68 is disposed between these two walls 70 and 74. An annular shoulder or rib 76 is formed along the inner lower corner of the groove. This annular shoulder 76 is simply the annular edge where horizontal annular wall 80 meets vertical annular wall 78.

Under relatively slight pressure or suction, the valve ring 68 rests lightly against the annular shoulder or rib 76 but a good seal is nonetheless effected. Under increased pressure or suction, the valve ring will deform against said annular shoulder or rib as Fig. 3 clearly shows. This will provide an even tighter seal.

The foregoing is illustrative of preferred forms of this invention and it will be understood that these preferred forms may be modified and other forms may be provided within the broad spirit of the invention and the broad scope of the claim.

I claim:

A check valve comprising a housing, a valve seat formed in said housing in the general shape of a truncated cone with its larger diameter at the top and its smaller diameter at the bottom, a cylindrical passage formed below said valve seat coaxially therewith, an inlet port communicating with said cylindrical passage below said valve seat, an outlet port above said valve seat and communicating with said cylindrical passage through said valve seat, said valve seat having a relatively narrow annular shoulder formed at its upper end and a second relatively narrow annular shoulder formed at its lower end, a vertically moveable valve stem disposed within said housing coaxially with said valve seat and said cylindrical passage, a spring engaging said valve stem and urging it downwardly, said valve stem having a reduced lower end portion which projects into the cylindrical passage and a conical shoulder above said reduced end portion, the conical angle of said conical shoulder on the valve stem being larger than the conical angle of the conical valve seat, said conical shoulder being adapted to enter said conical valve seat and to engage the upper annular shoulder on said valve seat, an annular groove being formed in said reduced lower end portion of the valve stem, an annular rib being formed in said annular groove along its inner, lower periphery, and an annular resilient valve ring carried in said annular groove, said valve ring being engageable by means of a relatively narrow line contact with said annular rib on the one hand and with the lower annular shoulder on the valve seat on the other hand in order to close the valve, the conical shoulder on the valve stem being engageable with the upper annular shoulder on the valve seat only when the valve ring is deformed to a predetermined extent between the annular rib on the valve stem and the lower annular shoulder on the valve seat in order to prevent excessive deformation of the valve ring under excessive valve pressure.

References Cited in the file of this patent

UNITED STATES PATENTS

| | | |
|---|---|---|
| 1,444,188 | Key | Feb. 6, 1923 |
| 2,417,494 | Kaiser | Mar. 18, 1947 |
| 2,552,053 | Miller | May 8, 1951 |
| 2,624,542 | Ghormley | Jan. 6, 1953 |
| 2,739,374 | Hoof | Mar. 27, 1956 |

FOREIGN PATENTS

| | | |
|---|---|---|
| 12,911 | Great Britain | June 7, 1904 |